June 26, 1962 — A. M. RICHARD — 3,041,584

MAGNETIC CORE DEVICES FOR HANDLING BINARY INFORMATIONS

Filed Jan. 30, 1958

Inventor:
André Michel Richard
By
Ralph B. Stewart 3,041,584

MAGNETIC CORE DEVICES FOR HANDLING BINARY INFORMATIONS

André Michel Richard, Paris, France, assignor to Societe d'Electronique et d'Automatisme, Courbevoie, France Filed Jan. 30, 1958, Ser. No. 712,249
Claims priority, application France Feb. 21, 1957
6 Claims. (Cl. 340—174)

The present invention relates to magnetic core information handling devices for the handling of binary digital information. In particular, the invention concerns a step-by-step register formed of a cascade of stages of magnetic core devices for the temporary registration of the digits as magnetic conditions of cores having a substantially rectangular hysteresis loop.

In the broad class of devices to which the invention relates, it is usual that each magnetic core of a step-by-step shifting register is provided with at least three windings, namely a control or transfer winding for driving a core from a predetermined magnetization condition to an opposite condition, the predetermined condition usually representing the digital value 1 and the opposite condition the digital value 0; a read-out or pick-up winding wherein a certain current is developed for such a change of conditions and another certain current for an absence of such a change of condition; and a write-in winding for bringing the said core to the said predetermined digital 1 condition, to effect temporary register of the digit. It is moreover customary to provide coupling circuits or networks between successive register stages for the temporary storage of a digit during the shifting process. Frequently such coupling circuits or networks involve the use of rectifiers or other unidirectional conducting elements and/or capacitors, and/or delay networks.

It is an object of the invention to provide an improved form of step-by-step shifting register which does not require either unidirectionally conducting elements or temporarily charged capacitors in the coupling circuits between its core stages.

According to the invention, a step-by-step magnetic core register comprises as each temporary registration stage thereof a pair of magnetic cores the write-in windings of which are connected in additive series and the pick-up windings of which are connected in subtractive series relation, each transfer or coupling connection between each pair of successive stages comprising a closed circuit in which both pick-up windings of the first stage and both write-in windings of the second of these stages are connected in series relation, one of the transfer control windings of a stage receiving a control current to reset the corresponding core to the zero representing magnetic condition and the other one of the said transfer windings receiving another control current having a phase-lag with respect to the first and being operable to reset the other core of the stage and to further produce the registration, if any, of a digital value 1 on both cores of the said second stage through the pick-up current from the first. In a complete step-by-step register with such stages the said transfer control currents are derived from dual three-phase systems for each group of three stages thereof.

Figure 1:
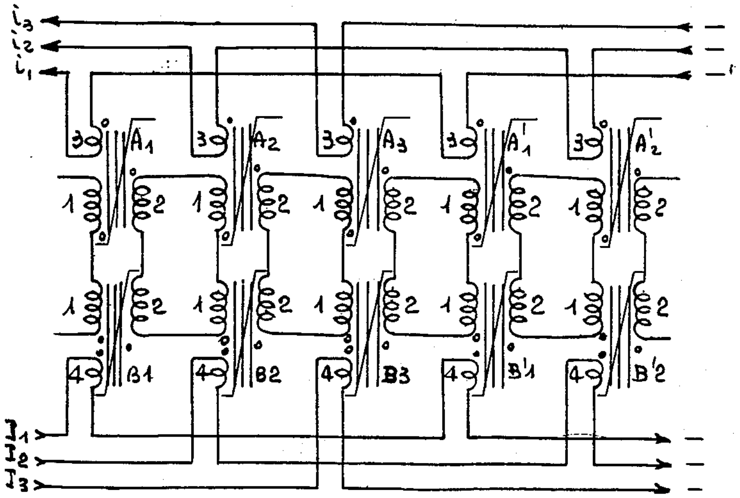
Figure 2:
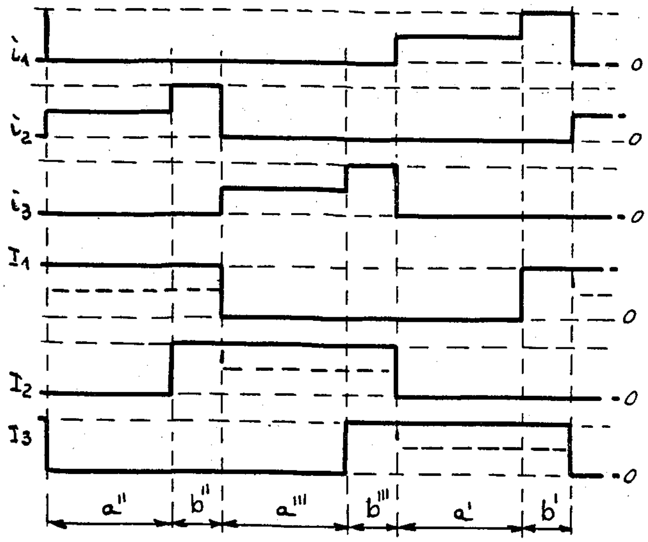

Reference will now be made for a further description to the accompanying drawings, wherein FIG. 1 shows a part of a step-by-step register of magnetic core stages according to the invention;

FIG. 2 shows a possible set of transfer control currents for the said register.

In the circuit diagram of FIG. 1 three stages are shown at A1—B1, A2—B2, A3—B3, constituting the three pairs of core devices useful for handling a single binary digit of any information, plus the two first stages A'1—B'1 and B'2—B'2 of the next following group of three stages which, consequently handle the preceding digit of the said information. These latter stages are mainly shown for better defining the interconnections of the control windings in such a register.

Each core is provided with a write-in winding 1 and a pick-up winding 2. The cores A are provided with a control winding 3 and the cores B with a control winding 4. The directions of action of the currents through these windings on the said cores are indicated by dots in the usual manner. The windings 1 of each stage are serially connected in additive relation, and the windings 2, in subtractive relation therebetween. Each coupling circuit between a pair of successive core stages comprises a closed circuit series connection of both the windings 2 and both the windings 1 of the concerned stages.

The windings 3 receive a system of currents $i_1$, $i_2$ and $i_3$ together constituting a three-phase system as shown in the respective graphs of their wave-forms in FIG. 2. The windings 4 similarly receive currents $I_1$, $I_2$ and $I_3$ constituting together another set of three-phase currents, as shown in the corresponding graphs of FIG. 2. The current $i_1$ passes through the series connected windings 3 of such cores as A1, A'1 . . . the current $i_2$ through the series connected windings 3 of such cores as A2, A'2 . . . the current $i_3$, through the series connected windings 3 of cores such as A3 . . . The currents $I_1$, $I_2$ and $I_3$ are similarly distributed to the windings 4 of the cores.

The control currents of FIG. 2 are direct current pulses occurring in cyclic relation, the timing of the different pulses during one complete cycle being shown in FIG. 2. Thus, the $i_1$, $i_2$ and $i_3$ pulses are spaced apart 120°, and each pulse covers a time period *a*, during which the pulse is of an intermediate value, and a period *b*, during which the pulse is of maximum value. Thus, the pulse $i_1$ is of intermediate value during period $a'$, of maximum value during period $b'$ and zero value during the remainder of the cycle. The periods of duration of pulses $i_2$ and $i_3$ are likewise shown at $a''$, $b''$ and $a'''$, $b'''$, respectively. The three-phase pulses $I_1$, $I_2$ and $I_3$ also are phase displaced but overlap each other as shown. $I_1$ and $I_2$ overlap during period $b''$; $I_1$ and $I_3$ overlap during period $b'$, and $I_2$ and $I_3$ overlap during period $b'''$.

Each transfer operation lasts a complete cycle covering two successive periods *a* and *b*. Thus, three transfer operations or cycles may occur in a single cycle of the control currents, as shown in FIG. 2, during the periods $a''—b''$, $a'''—b'''$ and $a'—b'$. Any one of the currents $i_1$, $i_2$, $i_3$ remains at a higher value thereof during the complete transfer cycle and then remains at a lower value, for instance zero, during the two following cycles of transfer operation. Any one of the currents $I_1$, $I_2$, $I_3$ assumes the higher value thereof during the period *b* of a cycle of transfer to which it contributes and remains at the said higher value during the next complete cycle of operation, whereupon it comes to a lower value, e.g. zero during the next following cycle plus the period *a* of a new operative cycle to which it contributes.

The overall rest condition is assumed to be such that all the cores are at a magnetic saturation condition G, then representing the digital value 0. The presence of a digital value 1 on any stage will make the cores of this stage take their opposite saturation condition D. When, for instance, such a digital value 1 is applied to the stage A2—B2, the following condition of the part of register of FIG. 1 exists:

| Stage index | (1) | (2) | (3) | (1') | (2') |
|---|---|---|---|---|---|
| Core A | G | D | G | G | G |
| Core B | G | D | G | G | G |

If the digital value of the next preceding digit is 0 in such a case, A'2—B'2 are at G.

For a transfer to be made in such a register, it suffices that the number of turns of the windings 2 are at least twice and preferably higher than twice the number of turns of the windings 1 of the stages.

The transfer operation is then as follows: Cores A2 and B2 are at D as assumed above, and pulse $i_2$ is applied to winding 3 of A2; during the period $a''$, the current $i_2$ is at a higher value thereof and the core A2 changes over its condition from D to G. However, during the period $a''$ the value of $i_2$ is not sufficient for inducing, by such a change of condition of A2, in the transfer circuit leading to the next stage A3—B3 such a current of transfer that the conditions of the said cores A3 and B3 are changed from one condition to the other, and the induced transfer current is insufficient to change the condition of B2, the coercitive currents not being reached for these cores. During the period $a''$ of action of $i_2$ the core B1 of the next preceding stage is maintained at the condition G as the current $I_1$ is at the higher value thereof during such a period.

At the end of the period $a''$ of the concerned cycle of transfer, the condition is as follows:

| Stage index | (1) | (2) | (3) | (1') | (2') |
|---|---|---|---|---|---|
| Core A | G | G | G | G | G |
| Core B | G | D | G | G | G |

During the period $b''$ of the said transfer cycle, a strong current $I_2$ appears in the winding 4 of core B2, so that this core changes its condition from D to G. Simultaneously, and from the current induced by the change-over of B2 into the circuit comprising the write-in windings of A3 and B3, these latter cores change over their conditions from G to D. The core B1 is maintained at G by the current $I_1$ at the higher value thereof, and the core A2 is maintained at G by a reinforcement or increase in $i_2$ during period $b''$, see the graphs of FIG. 2 in these respects. At the end of $b''$ of the concerned cycle of transfer, the condition of the register is:

| Stage index | (1) | (2) | (3) | (1') | (2') |
|---|---|---|---|---|---|
| Core A | G | G | D | G | G |
| Core B | G | G | D | G | G |

Thus the digital value 1 has been actually transferred from the stage A2—B2 to the stage A3—B3. The same process repeats for each successive transfer period $a+b$ so that in the course of a complete shift cycle the digital value 1 is transferred from A3, B3 to A'1, B'1 and then from A'1, B'1 to A'2, B'2.

It is apparent, without detailing the conditions thereof that when a digital value of a stage is 0, both cores of the stage are at G, and no action on these cores is produced by the currents $i_1$—$i_2$—$i_3$ and $I_1$—$I_2$—$I_3$.

As said, the waveforms of the two sets of three-phase currents may be chosen according to different ways, for instance the currents I might fall to a lower value immediately after the period $b$ of their respective transfer alternations, with a suitable ratio of turns of the windings 2 and 1; the two levels of the currents $i$ may be omitted or better said distributed on two separate windings on cores A, and so forth. Those and other technological alternatives of the described examples remain in the scope of the invention.

What is claimed is:

1. A magnetic core shift-register system for binary digital information comprising a cascaded plurality of magnetic core stages each of which includes a pair of magnetic cores having a substantially rectangular loop characteristic and each core having wound thereon a write-in winding, a transfer winding, and a pick-up winding, the two write-in windings of each stage being connected in additive serial connection, the two pick-up windings of each stage being connected in subtractive serial connection, the ratio of turns of the pick-up winding to the turns of the write-in winding on each core being not less than 2, a coupling circuit between adjacent stages comprising a closed circuit connecting the serially-connected pick-up windings of one stage in series with the serially-connected write-in windings of the next stage, and control circuits for energizing the two transfer windings of each stage with periodic transfer pulses, the pulses applied to one transfer winding being displaced in phase with respect to the pulses applied to the other transfer winding.

2. A magnetic core shift-register according to claim 1 wherein said control circuits for energizing said transfer windings comprise a first three-phase circuit for energizing one transfer winding of each pair, successive transfer windings being energized by different phases, and a second three-phase circuit generating pulses displaced in phase with respect to the pulses of said first circuit and energizing the other transfer winding of each pair, successive transfer windings being energized by different phases of the second three-phase circuit.

3. A shift-register according to claim 2 wherein all the transfer windings which are energized in like phase are connected in series in an energizing circuit.

4. In a magnetic core shift-register, the combination of a pair of magnetic cores having a substantially rectangular loop characteristic and each having a write-in winding, a pick-up winding and a transfer winding, an input circuit connecting said write-in windings in series aiding relation, an output circuit connecting said pick-up windings in series opposing relation, a circuit for energizing one transfer winding with periodic shift pulses, and a separate circuit for energizing the other transfer winding with shift pulses displaced in phase with respect to the pulses energizing said one transfer winding.

5. A magnetic core shift-register comprising a first series of magnetic cores of substantially rectangular loop characteristic and each having wound thereon a write-in winding, a pick-up winding and a transfer winding, a second series of magnetic cores having windings identical with said first series of cores, each core in the second series being paired with a corresponding core in the first series, the write-in windings of each pair of cores being connected in series aiding relation, and the pick-up windings of each pair being connected in series opposing relation and being connected in series with the write-in windings of the next succeeding pair of cores, the ratio of turns of the pick-up winding to the turns of the write-in winding on each core being not less than 2, a first control circuit for energizing the transfer windings of regularly spaced cores in said first series by regularly spaced pulses of like timing, a second control circuit for energizing other regularly spaced cores in said first series with transfer pulses of the same timing but displaced in phase with respect to the pulses of said first control circuit, a third control circuit for energizing the shift coils of regularly spaced cores in said second series by transfer pulses having a different phasing with respect to the pulses of said first and second control circuits, and a fourth control circuit for energizing the transfer windings of other regularly spaced cores in said second series with transfer pulses having a different phasing from the transfer pulses of the said first, second and third control circuits.

6. A magnetic core shift-register comprising a first series of magnetic core devices arranged in cascade and arranged in groups of three devices each, a second series of magnetic core devices arranged in cascade, each device in the second cascade being paired with a corresponding device in the first cascade, each magnetic core device comprising a rectangular-loop core having wound thereon a write-in winding, a read-out winding and a transfer winding, the write-in windings of each pair of cores being connected in series aiding relation and the read-out windings of each pair of cores being connected in series opposing relation and connected in series with the write-in windings of the next succeeding pair of cores, the ratio of turns of the pick-up winding to the turns of the write-in winding on each core being not less than 2, a source of three-phase shift pulses for energizing the first, second and third transfer windings in each group of the first cascade from different phases thereof, and a second source of three-phase shift pulses displaced in phase with respect to said first source for energizing the first, second and third transfer windings of the cores in the groups of the second cascade from different phases thereof.

References Cited in the file of this patent

UNITED STATES PATENTS

| | | |
|---|---|---|
| 2,680,819 | Booth | June 8, 1954 |
| 2,708,722 | An Wang | May 17, 1955 |
| 2,781,503 | Saunders | Feb. 12, 1957 |
| 2,901,637 | An Wang | Aug. 25, 1959 |